S. L. DONNELL.
Combined Corn and Cotton Seed Planter and Guano Distributer.
No. 100,990.　　　　　　　　　　　　Patented March 22, 1870.
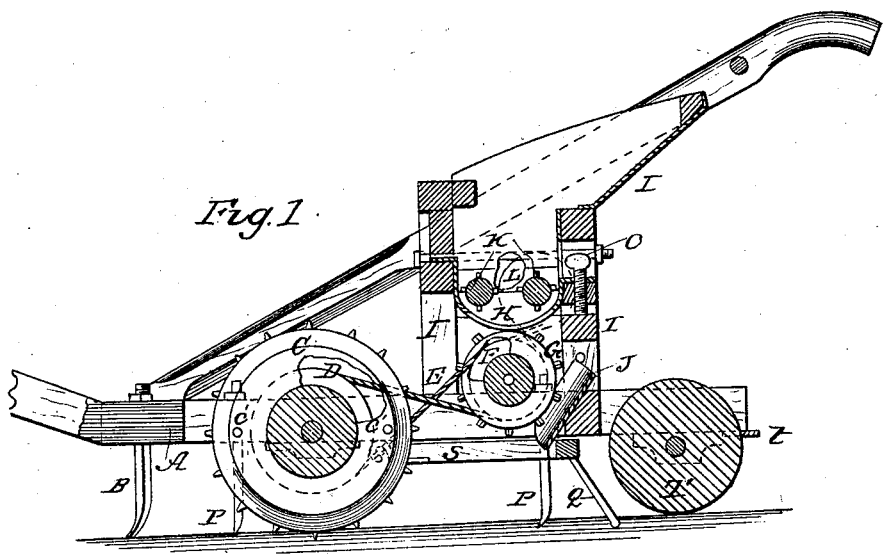
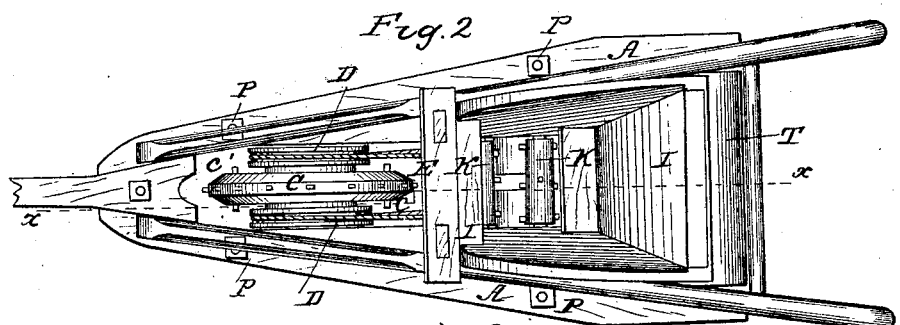
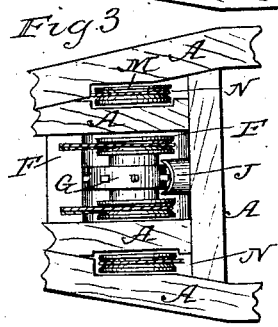
Witnesses
Edgar Tate
Jno E Brooks
Inventor
S. L. Donnell
per Munn & Co
Atty's

United States Patent Office.

SAMUEL L. DONNELL, OF HUMBOLDT, TENNESSEE.

Letters Patent No. 100,990, dated March 22, 1870.

IMPROVEMENT IN COMBINED CORN AND COTTON-SEED PLANTER AND GUANO-DISTRIBUTER.

The Schedule referred to in these Letters Patent and making part of the same.

To all whom it may concern:

Be it known that I, SAMUEL L. DONNELL, of Humboldt, in the county of Gibson and State of Tennessee, have invented a new and useful Improvement in Combined Corn and Cotton-Seed Planter, Guano-Distributer, and Harrow; and I do hereby declare that the following is a full, clear, and exact description thereof, which will enable others skilled in the art to make and use the same, reference being had to the accompanying drawings forming part of this specification, in which—

Figure 1 is a vertical longitudinal section of my improved machine taken through the line $x\,x$, fig. 2, parts being broken away to show the construction.

Figure 2 is a top view of the same.

Figure 3 is a detail under-side view of the pick or wheel for distributing cotton seed, and its attachments.

Similar letters of reference indicate corresponding parts.

This invention relates to a combined cotton-seed planter and manure-distributer, and consists in certain improvements thereon, which will be stated hereinafter.

A is the frame of the machine, to the forward part of which is attached the tooth or plow B for opening the furrow to receive the seed.

The lower or working part of the tooth B is bent forward, as shown in fig. 1, so that, when working in soil abounding in roots, the said tooth may be detached and reversed, so as to slide over the said roots.

C is a wheel pivoted to the frame A directly in the rear of the opening-tooth or plow B.

The face of the wheel C is made V-shaped to press open the furrow opened by the tooth B, and is armed with spikes or teeth to enable it to take a firm hold upon the ground to insure its turning.

D are two pulleys attached to or connected with the spiked or toothed wheel C, so as to be carried around with said wheel C in its revolution.

E are bands which pass around the pulleys D, and around the pulleys F attached to or formed upon the shaft of the pick or toothed wheel G, which shaft revolves in bearings attached to the frame A, in such positions that the face of the said wheel G may work in a slot in the bottom H of the hopper I, and is armed with hooks, spikes, or teeth, to take hold of the cotton seed or manure and draw it out into the spout J attached to the frame-work of the machine, and by which it is conducted into the furrow opened by the tooth B and wheel C.

K are two rollers, the faces of which are studded with spikes or teeth, and the journals of which revolve in bearings attached to the frame-work of the hopper I in such positions that the said toothed rollers K may revolve in the lower part of the hopper I to keep the cotton seed or manure stirred up, and feed it down to the toothed wheel or pick G.

To the projecting end of one of the journals of each of the rollers K, and upon the opposite sides of the hopper I, is attached a pulley, L around which, and around the pulleys M attached to the shaft of the pick G, pass the belts or bands N, so that the said toothed rollers may be revolved by the advance of the machine.

The bottom H of the hopper I is adjustable, and may be raised and lowered by the set-screw O to regulate the amount of seed fed out by the toothed wheel G.

P are harrow-teeth, any desired number of which may be detachably attached to the frame A.

Q are harrow or rake-teeth attached to a cross-bar, R, to the ends of which cross-bar are attached the rear ends of the side bars S, the forward ends of which have hooks attached to them to hook into eyes attached to the frame A, in such positions that the teeth Q may be drawn through the ground in the rear of the conductor-spout J to loosen up the soil upon each side of the furrow and cover the seed, the covering of the seed being completed and the top of the ridge smoothed off by the roller T, the journals of which revolve in bearings attached to the rear part of the frame A.

Having thus described my invention,

I claim as new and desire to secure by Letters Patent—

1. The combination with a hopper of a furrow-opener B, bevel-edged wheel C, and rake Q R S, all arranged and operated as set forth to open the furrows, press apart and form a well-defined bed, drop the seed and cover the same, in the manner described.

2. The combination with hopper I having slotted bottom H, of two spiked stirrers K K, spike-wheel G, and spout J, all constructed, arranged, and operated as set forth.

3. The rake Q R S, and roller T, in combination with each other and with the frame A, toothel wheel G, toothed rollers K, and toothed wheel C, substantially as herein shown and described and for the purpose set forth.

SAML. L. DONNELL.

Witnesses:
A. I. D. THURSTON,
SAMUEL SHANE.